(12) United States Patent
Waite et al.

(10) Patent No.: US 7,024,342 B1
(45) Date of Patent: Apr. 4, 2006

(54) THERMAL FLOW SIMULATION FOR CASTING/MOLDING PROCESSES

(75) Inventors: David Marc Waite, Coralville, IA (US); Shaupoh Wang, Chesterfield, MO (US); Jenn-Yeu Nieh, Chesterfield, MO (US)

(73) Assignee: Mercury Marine, Fond due Lac, WI (US)

( * ) Notice: Subject to any disclaimer, the term of this patent is extended or adjusted under 35 U.S.C. 154(b) by 1012 days.

(21) Appl. No.: 09/610,390

(22) Filed: Jul. 1, 2000

(51) Int. Cl.
G06G 7/48 (2006.01)

(52) U.S. Cl. .................... 703/6; 700/30; 700/90; 700/118; 700/119; 700/146; 700/147; 700/150; 700/171; 700/173; 700/182; 700/197; 703/1; 703/2; 703/7; 703/12

(58) Field of Classification Search .............. 703/6, 703/9, 10, 11, 12; 700/281, 282, 283, 197
See application file for complete search history.

(56) References Cited

U.S. PATENT DOCUMENTS

| | | | |
|---|---|---|---|
| 3,840,364 A | 10/1974 | Flemings et al. | 75/63 |
| 3,842,895 A | 10/1974 | Mehrabian et al. | 164/49 |
| 3,902,544 A | 9/1975 | Flemings et al. | 164/71 |
| 3,948,650 A | 4/1976 | Flemings et al. | 75/135 |
| 3,951,651 A | 4/1976 | Mehrabian et al. | 75/135 |
| 4,089,680 A | 5/1978 | Flemings et al. | 75/129 |
| 4,108,643 A | 8/1978 | Flemings et al. | 75/135 |
| 4,125,364 A | 11/1978 | Stephens | 432/145 |
| 4,174,214 A | 11/1979 | Bennett et al. | 75/168 R |
| 4,229,210 A | 10/1980 | Winter et al. | 75/10 |
| 4,345,637 A | 8/1982 | Flemings et al. | 164/113 |
| 4,415,374 A | 11/1983 | Young et al. | 148/2 |
| 4,434,837 A | 3/1984 | Winter et al. | 164/468 |
| 4,450,893 A | 5/1984 | Winter et al. | 164/468 |
| 4,457,354 A | 7/1984 | Dantzig et al. | 164/468 |
| 4,457,355 A | 7/1984 | Winter et al. | 164/468 |
| 4,463,795 A | 8/1984 | Chielens et al. | 164/455 |
| 4,465,118 A | 8/1984 | Dantzig et al. | 164/452 |
| 4,482,012 A | 11/1984 | Young et al. | 165/146 |

(Continued)

FOREIGN PATENT DOCUMENTS

EP    0 701 002 A1    3/1996

(Continued)

OTHER PUBLICATIONS

Christon, A Vectorized 3-D Finite Element Model for Transient Simulation of Two-Phase Heat Transport with Phase Transformation and a Moving Interface, IEEE 1990.*

(Continued)

*Primary Examiner*—Kevin J. Teska
*Assistant Examiner*—Tom Stevens
(74) *Attorney, Agent, or Firm*—Woodard, Emhardt, Moriarty, McNett & Henry LLP

(57) ABSTRACT

A numerical procedure for simulating the behavior of incompressible, viscous fluid in a casting/molding process. The method is based on classical fluid dynamic equations and uses control volume-finite element and numerical techniques to solve the momentum and energy equations to obtain solution for the variable parameters. The method incorporates five additional modules which simulate fluid flow in the shot sleeve, heat transfer between the die and the heat transfer fluid, die cooling by lubricant, formation of mend line. These additional simulation modules produce realistic boundary conditions, and replace many of the assumptions that would have to be made, to solve the governing equations. These added improvements ensure a faster convergence of the numerical solution and a more realistic simulation of the die casting process.

15 Claims, 9 Drawing Sheets

U.S. PATENT DOCUMENTS

| | | | |
|---|---|---|---|
| 4,494,461 A | 1/1985 | Pryor et al. ................. | 102/464 |
| 4,523,624 A | 6/1985 | Dantzig et al. ............. | 164/454 |
| 4,524,820 A | 6/1985 | Gullotti et al. ............. | 164/476 |
| 4,530,404 A | 7/1985 | Vives .......................... | 164/467 |
| 4,534,003 A | 8/1985 | Manzione | |
| 4,555,272 A | 11/1985 | Ashok et al. .................. | 148/3 |
| 4,565,241 A | 1/1986 | Young ......................... | 164/499 |
| 4,569,218 A | 2/1986 | Baker et al. .................. | 72/342 |
| 4,607,682 A | 8/1986 | Dantzig et al. ............. | 164/418 |
| RE32,529 E | 10/1987 | Vives .......................... | 164/467 |
| 4,709,746 A | 12/1987 | Young et al. ............... | 164/485 |
| 4,712,413 A | 12/1987 | Koch .......................... | 72/361 |
| 4,838,988 A | 6/1989 | Lang et al. .................. | 156/624 |
| 4,972,334 A * | 11/1990 | Yamabe et al. ............... | 700/86 |
| 4,989,166 A | 1/1991 | Akasaka et al. ............. | 364/578 |
| 5,010,501 A | 4/1991 | Arakawa .................... | 364/522 |
| 5,031,108 A | 7/1991 | Fujita et al. | |
| 5,050,114 A * | 9/1991 | Lee ............................... | 703/9 |
| 5,129,035 A * | 7/1992 | Saji et al. .................... | 717/106 |
| 5,219,018 A | 6/1993 | Meyer ......................... | 164/468 |
| 5,227,979 A | 7/1993 | Fukuhira et al. | |
| 5,265,040 A * | 11/1993 | Saji et al. .................... | 345/441 |
| 5,315,530 A * | 5/1994 | Gerhardt et al. ............ | 700/282 |
| 5,377,119 A * | 12/1994 | Backer et al. ............... | 700/146 |
| 5,402,366 A | 3/1995 | Kihara et al. | |
| 5,408,638 A * | 4/1995 | Sagawa et al. ................. | 703/2 |
| 5,411,686 A | 5/1995 | Hata .......................... | 264/40.6 |
| 5,432,718 A | 7/1995 | Molvig et al. | |
| 5,499,198 A * | 3/1996 | Gaidos et al. .............. | 700/283 |
| 5,529,391 A | 6/1996 | Kindman et al. ........... | 366/145 |
| 5,553,206 A | 9/1996 | Meshkat ...................... | 395/123 |
| 5,585,067 A | 12/1996 | Leroy et al. ................. | 420/554 |
| 5,625,579 A * | 4/1997 | Hinsberg et al. ............... | 703/9 |
| 5,630,466 A | 5/1997 | Garat et al. .................. | 164/457 |
| 5,640,331 A * | 6/1997 | Dahm et al. .................... | 702/22 |
| 5,661,670 A * | 8/1997 | Bharathan et al. ............. | 703/5 |
| 5,677,844 A | 10/1997 | Kubo .................... | 364/472.02 |
| 5,701,942 A | 12/1997 | Adachi et al. ............. | 164/71.1 |
| 5,732,192 A | 3/1998 | Malin et al. | |
| 5,819,073 A * | 10/1998 | Nakamura .................... | 703/13 |
| 5,838,587 A * | 11/1998 | Maisotsenko et al. .......... | 703/9 |
| 5,899,567 A | 5/1999 | Morris, Jr. .................. | 366/274 |
| 5,900,080 A | 5/1999 | Baldi et al. ................. | 148/550 |
| 5,912,823 A | 6/1999 | Grant | |
| 5,925,199 A | 7/1999 | Shiina et al. ............... | 148/538 |
| 5,940,309 A * | 8/1999 | White et al. .................... | 703/9 |
| 5,953,239 A | 9/1999 | Teixeira et al. | |
| 5,988,259 A | 11/1999 | Welker et al. .............. | 164/455 |
| 6,019,930 A | 2/2000 | Baresich ..................... | 264/327 |
| 6,064,810 A | 5/2000 | Raad et al. | |
| 6,089,744 A * | 7/2000 | Chen et al. ..................... | 703/9 |
| 6,096,088 A * | 8/2000 | Yu et al. ......................... | 703/9 |
| 6,304,794 B1 * | 10/2001 | Nishimine et al. .......... | 700/197 |
| 6,480,190 B1 * | 11/2002 | Pfister et al. ................ | 345/419 |
| 6,519,554 B1 * | 2/2003 | Gieseke et al. ................. | 703/6 |
| 6,530,418 B1 * | 3/2003 | Ebisu et al. .......... | 164/502 VF |
| 6,611,736 B1 * | 8/2003 | Waite et al. ................. | 700/281 |

FOREIGN PATENT DOCUMENTS

| | | |
|---|---|---|
| EP | 0710 515 A1 | 5/1996 |
| EP | 0 745 694 A1 | 12/1996 |
| EP | 0 841 406 A1 | 5/1998 |
| EP | 0 903 193 A1 | 3/1999 |
| WO | WO95/19237 | 7/1995 |
| WO | WO98/23403 | 6/1998 |
| WO | WO 98/30346 | 7/1998 |
| WO | WO99/50007 | 10/1999 |
| WO | WO00/05015 | 2/2000 |

OTHER PUBLICATIONS

Felicelli et al., Numberical Simulation of Freckle Formation in Directional Solidification of Binary Alloys, IEEE 1992.*

Gumis et al., Finite Element Solution of Thermal Convection on A Hypercube Concurrent Computer, ACM 1988.*

Ganzha et al., Symbolic-Numeric Stability Investigations of Jameson's Schemes for the Thin-layer Navier-Stokes Equations, ACM 1994.*

Sethian et al., Computing Turbulent Flow in complex Geometries on a Massively Parallel Processor, ACM 1991.*

Tomovic-M.M. "Simulation Software Makes Metacasting Course More Interesting and Challenging" p. 1405-1408, vol. 3 1996 IEEE.*

"Semisolid Metal Process Eliminates Preformed Billets", by Samuel D. Norville, *Die Casting Management*, Mar. 1998, pp. 31-33.

S. C. Chen, et al., "Simulation of Injection-Compression Mold-Filling Process", *Int. Comm. Heat Mass Transfer*, vol. 25, No. 7, pp. 907-917 (1998).

* cited by examiner

THERMAL FLOW SIMULATION FOR CASTING/MOLDING PROCESSES

CROSS REFERENCE TO RELATED APPLICATION

The present application relates to a commonly owned, issued U.S. Patent, entitled EQUAL ORDER METHOD FOR FLUID FLOW SIMULATION, filed on even day herewith by the same inventive entity. The referenced application is incorporated herein by reference in its entirety.

FIELD OF THE INVENTION

This invention relates to a method for simulating the behavior of a fluid during a casting/molding process, in particular, to a numerical method for simulating incompressible, viscous melt flow in a die cavity.

BACKGROUND OF THE INVENTION

In manufacturing casting/molding processes, for product quality of the molded article, it is of importance to optimize the mold design and the process conditions. Conventionally, such optimization is attained after many trial and error experiments which are repeated on the basis of the rule of thumb of an expert. With the advance in computer technology, it has become possible to analyze flow behavior of a material during a casting/molding process by computer simulation. When realistically modeled, the results from such simulation may be used to predict the casting behavior, thereby improving the efficiency of product and mold-design, and optimization of processing conditions.

Conventional methods for simulating fluid flow in a casting/molding process generally involve applying the equations of motion, continuity and energy to a discretized model of the molded part and performing numerical calculations thereof to obtain velocity, pressure, and temperature distributions along the processing line. In these simulations, the thermal physical properties of the material, the operational characteristic such as temperature of the material, temperature of the mold and injection speed, etc., are required input for the simulation. These inputs are generally assumptions made based on experimental know-how obtained from repeated comparisons between the analytical results and the actual moldings. The conventional models generally provide no means for determining whether or not input conditions are appropriate. It is therefore necessary to supply realistic boundary conditions before an accurate simulation can be achieved. Conventional fluid flow models lack many refinements which would enable better estimation of the boundary conditions, and hence often fail to achieve an accurate simulation.

One refinement which would be desirable, is incorporating the flow in the shot sleeve into the model. In a traditional die-casting process, molten material is delivered from the reactor to a die through a gated shot sleeve. Pressure is applied via a ram or plunger to eject the molten material from the shot sleeve. Due to discontinuity created by the moving ram and the resulting instability in numerical models, many prior art models start the simulation at the gate entrance and make the assumption that the pressure or velocity applied by the ram is uniform across the gate surface. In addition, prior art simulations assume the fluid contained within the shot sleeve has a uniform pressure and temperature. In practice, the molten metal in the shot sleeve always has some temperature variation, and the pressure applied to the billet across the ram face is non-uniform. More importantly, the thickness and temperature of biscuit remains in the shot sleeve after the cavity is filled has a major effect on the effectiveness of pressurization, which is required to suppress the formation of shrinkage porosity. This non-uniformity of temperature pressure and material flow in the short sleeve, if not corrected, ultimately compromises the accuracy of the mass flux computation of a flow model. Incorporating flow in the shot sleeve as part of the flow model would correct this deficiency.

Another refinement, which would be desirable, is to incorporate the heat exchange between the die and the heat-transfer fluid (HTF) into the model. A process parameter common to all metal die casting or plastic injection molding processes, including semi-solid forming, is the temperature control of the die. The temperature of the die is generally maintained by HTF contained in the heat transfer line which is embedded in the body of the die. Heated oil or water can be used to pre-heat the die to shorten the start-up time and the corresponding scrap. During continuous production, the temperature of the HTF can be adjusted to maintain the cyclic thermal balance in the die. Many attempts have been made to incorporate the heat transfer between the die and the HTF in a flow model. The most vigorous and resource-demanding approach is to use full 3D model to simulate the flow and convection heat transfer of the HTF inside the duct. In order to reduce the computational time, most of the existing models neglect the flow and temperature change of the HTF in the die. Instead, the user is required to select the element surfaces of the heat transfer lines and to assign, as thermal boundary conditions, a HTF temperature and a heat transfer coefficient. Since the HTF's viscosity changes with its temperature, which varies through the entire loop, it is very difficult for the user to determine the coefficient, as the Reynolds number and Prandtl number are not constant. A method which updates the heat transfer coefficient of the HTF as its temperature varies, such that the heat flux from the die to the HTF may be accurately determined, would be desirable.

A method for predicting the formation of shrinkage porosity would also be a desirable feature to be incorporated in a metal casting, e.g. semi-solid forming, simulation model. Shrinkage porosity formation is a common problem for metal casting process. When molten metal fills the cavity in a die which is at a lower temperature than the molten metal, the molten metal loses its thermal energy to the die and begins to solidify. As the liquid phase changes to solid, its density increases. If there is no additional material fed into the cavity, the net volume of the metal will become less than that of the cavity and shrinkage porosity will result. Depending on its size and distribution, shrinkage porosity could compromise the mechanical properties of a product, especially its elongation and fatigue strength, significantly. For pressure tight products, shrinkage porosity may randomly form multiple chained paths and cause leaking. Accurate predictions of shrinkage porosity are essential, when designing a structural component, e.g. control arm and knuckle, and high-pressure housing, e.g. air-conditioner housing and fuel-injection rail.

So far, the state-of-the-art casting simulation programs can only display potential locations of shrinkage porosity based on the hot spots (non-solidified metal surrounded by solidified metal) within the alloy's volume. In addition to temperature distribution, some of the programs also incorporate cooling rate and its empirical correlation to predict shrinkage porosity. However, the formation of shrinkage porosity is actually coupled not just with the thermal factors but also with the flow and pressurization. If the molten material in the cavity is in direct communication with a pressurized liquid metal source, e.g. the remaining liquid metal in the shot sleeve, additional material may be pushed into the cavity to compensate the volume shrinkage and to suppress the formation of shrinkage porosity. The required pressure depends on the viscosity of the solidifying metal, the alloy's temperature and the cavity's geometry. For accurate predictions and hence prevention of the formation of shrinkage porosity, a model that simulates both the thermal variation and the flow of the molten material would be required.

Another feature that is important to any casting or mold filling process is monitoring the cooling of the die after the part is ejected. Generally in a pressure casting process, after the metal solidifies in the cavity, the die opens to eject the part. A water-based lubricant is then sprayed on the mold walls for die release and to prevent drag mark or soldering. As the lubricant typically contains 98% water, it removes most of the thermal energy transferred to the die from the alloy. In order to predict the die temperature and its heat transfer with the alloy, the cooling effects of the lubricant spray in the model must be incorporated. However, due to the severe process conditions, there is no realistic method to determine the die temperature and hence the rate of heat removal by the lubricant. In addition, there are generally multiple nozzles spraying lubricants from different angles. Sometimes, these nozzles may move back and forth to spray lubricant more uniformly. Furthermore, depending on the type of nozzle, distance from the mold surface and spray pressure, the resulting distribution of cooling effects is not uniform. As a result, it is very difficult for user to define the corresponding cooling coefficient on the mold surface, especially one with complex shape. In some of the existing program, the user has to manually select and assign cooling coefficients on those elements surfaces that may be covered by the spray. In cases where that the nozzle moves, it would take too much time to set up the cooling coefficients. A model that computes the cooling efficiency from the geometry of the spray nozzle and its motion would be desirable.

A model to predict the location of a mend line and trapped air would also be a desirable feature for incorporation in a casting or molding simulation. When molten material fills a cavity, the melt front may split, e.g. to go around a core or a hole, and re-join. As the melt front is in contact with die steel and air, it may become too cold and/or contaminated by the residual lubricant or moisture. In addition, if the die is inappropriately designed, the cavity may not be filled progressively and air may be trapped inside the molten metal. As a result, wherever melt fronts meet, the bonding on the interface may be weakened due to solidification, trapped air or impurities.

Although the user can display the filling pattern from various angles to search for mend lines, it is very time consuming and not reliable, especially if the part is large and complicated. Furthermore, after the melt fronts meet, they could continue to move if the cavity was not completely filled. As a result, the final position of the weakened bonding interface may be different from the original mending location. In addition, the strength of bonding could be improved if there is a vigorous mixing of the material across the interface. It is very important in the design stage to be able to identify these potential casting defects quantitatively so that preventive design can be incorporated early in the design stage. Otherwise, the processing window would become very tight and it would be difficult to maintain consistent quality.

Therefore, there is a need for a new method which incorporates the aforementioned refinements such that incompressible, viscous fluid flow behavior in a casting/molding process can be accurately modeled by computer simulations.

SUMMARY OF THE INVENTION

Accordingly, an object of the present invention is to provide an improved method for simulating incompressible, viscous melt flow in a casting/molding process.

Related objects and advantages of the present invention will be apparent from the following description.

The present invention provides a method for simulating thermal flow during a molding/casting process, which satisfies the Navier-Stokes equations and the energy equation. This method incorporates five flow and thermal modules which simulate flow in shot-sleeve module, heat exchange in heat-transfer line, die cooling by lubricant, shrinkage porosity formation, and mend line formation in the casting/molding process. The incorporation of these modules provides better prediction of the boundary conditions and hence more accurate simulation. The modules may be incorporated in the overall casting model in any combination.

One aspect of the invention is a method for simulating thermal flows for casting/molding processes, comprising: (a) selecting simulation modules for incorporation in an overall simulation sequence, said modules including a Flow in Shot Sleeve Module, a Shrinkage Porosity Prediction Module, a Heat Transfer Fluid Line Module, and a Die Lubricant Cooling Module; discretizing flow domain into elements having nodes and fluxing surfaces, inputting initial parameter value and process conditions; (b) incrementing the time by an incrementing time step; (c) updating material balances; (d) forming and solving momentum equations, and updating velocity and pressure fields; (e) forming and solving energy equations, and updating temperature field; (f) checking if parameters have converged, returning to step (d) if they have not; (g) determining whether an end-simulation event has occurred, returning to step (c) if it has not; and (h) deciding whether to execute post-processor simulation modules, said post-processor simulation modules including a Mend Line Prediction Module.

DESCRIPTION OF THE PREFERRED EMBODIMENT

Figure 1:
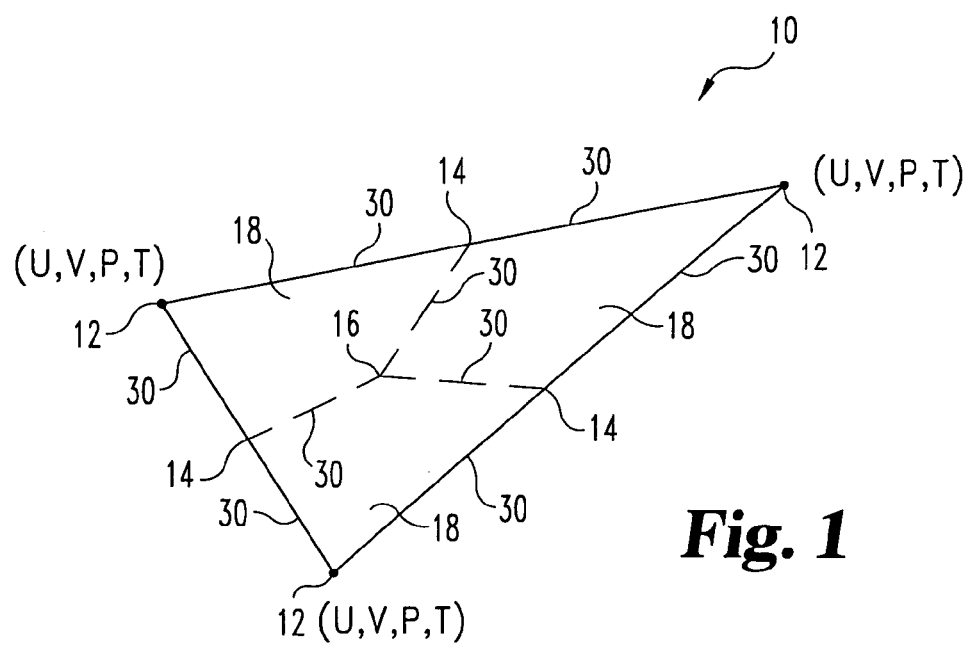
FIG. 1 is a schematic drawing of a triangular finite element to two-dimensional problem with the method of the present invention containing a control volume and associated sub-control volumes and fluxing surfaces.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein being contemplated as would normally occur to one skilled in the art to which the invention relates are also included.

An embodiment of the present invention is a numerical method for computer simulation of the behavior of an incompressible, viscous fluid during a casting/molding process. The illustrated method is based on classical fluid dynamic models, and numerically (through the use of a computation device, generally a computer) obtains solutions to the governing equations at user defined time intervals. The illustrated method has general application to all thermal flows in casting/molding processes.

The method improves upon prior art methods by provides five novel modules: a Flow in Shot Sleeve Module, a Heat Transfer Line Module, a Die Lubricant Cooling Module, a Shrinkage Porosity Prediction Module, and a Mend Line Prediction Module, each of which simulates an aspect of the casting/molding process. Depending on the objective of simulation, engineer optionally selects to incorporate all or just some of the modules in a simulation. These modules provide realistic boundary conditions for solving the governing fluid dynamic equations. The sequential operations of each module is described in individual flow charts, separate from the overall simulation sequence. In these flow charts, the modules are depicted as complete sub-routines, mainly for illustrative purposes. However, it should be apparent to those skilled in the art that in an actual simulation where these modules are incorporated, the operations of the modules are integrated, in varying degrees, into the overall simulation sequence, and may become indistinguishable. The modules will be described in detail later.

The illustrated embodiment of the present invention employs a control volume-fixed mesh element model. The flow velocity and other physical parameters are calculated at the nodal points and may also be at interfacial surfaces. Although moving mesh methods are generally able to track the motions of the free surface more accurately than the fixed mesh methods, those approaches still have problems whenever interfaces come into each other or the die wall. A fixed mesh method is, therefore, preferred. However, a moving mesh model, which has overcome the moving-interfacial problems, may be used. In addition, any type of grid pattern in which the grid can be split into uniquely defined control volumes and that each of these control volumes can be associated with a unique node or grid point may be used. Preferably, the flow domain is discretized into a finite element mesh. The geometric flexibility of finite elements provides more accurate representation in fitting irregular domains and in providing local mesh refinement.

Figure 2:
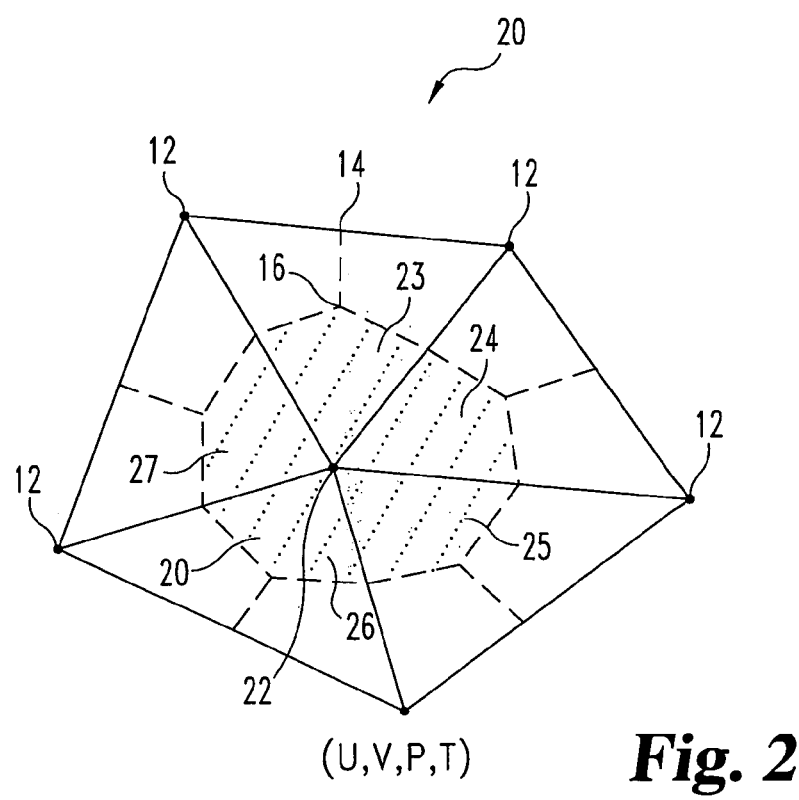
FIG. 2 is a schematic drawing showing a nodal control volume.

The illustrated embodiment of the method is based on a mesh composed of a three-node, two dimensional, triangular finite element similar to that shown in FIGS. 1 and 2. Referring now to FIG. 1, the triangle finite element 10 has three vertex nodes 12. Thermal physical parameters of the flow, e.g. temperature, velocity and pressures are evaluated at nodes 12 of element 10. Finite element 10 can be divided into three sub-control volumes (SCVs) 18 by joining the mid-side points 14 to the centroid 16. Each of sub-control volumes 18 is bounded by four fluxing surfaces 30 where material can flow from one sub-control volume to another. Typically, a number of sub-control volumes 18 surround a vertex node 12 and conveniently defines a control volume (CV) for that node. The sub-control volumes 18 that are attached to a particular node i, are collectively known as the control volume of node i. For example, as shown in FIG. 2, vertex node 22 is surrounded by five sub-control volumes 23–27 and the shaded area represents control volume 20 of vertex node 22. While it is illustrated that control volume 20 is defined by the sub-control volumes 23–27 attached to vertex node 22, control volumes can be composed of one or more sub-control volumes depending on the geometry of the flow domain. For a given mesh, a flexible combination of the SCVs is much better than solely relying on CVs in defining the irregular shape of the free surface of the flowing fluid.

Figure 3:
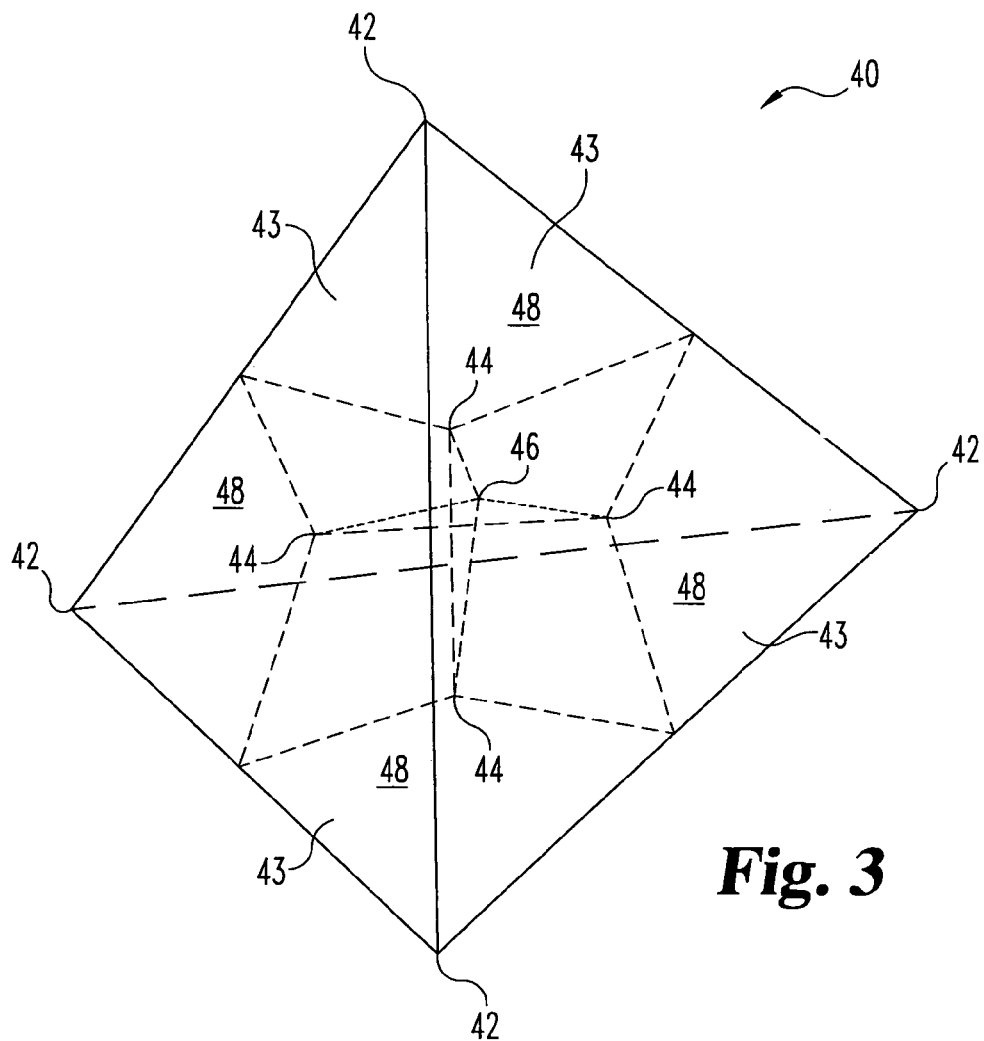
FIG. 3 is a schematic drawing of a finite element.

For modeling a three-dimensional problem, where a three-dimensional mesh is required, a mesh composed of tetrahedral finite element is preferred. As shown in FIG. 3, tetrahedral element 40 has four vertex nodes 42 and four surfaces 43. Finite element 40 can be divided into four sub-control volumes (SCVs) 48 by joining the surface centroid 44 (centroid at each surface of the tetrahedral element 40) to the volume centroid 46 (the centroid of the tetrahedron). Each of the sub-control volumes 48 is a hexahedron having six fluxing surfaces.

While triangular and tetrahedral finite element are illustrated and preferred, it should be understood that other geometric shaped finite elements or a combination thereof may be used, and linear finite elements are preferred.

In this method the governing equations (1)–(3) can be expressed as:

Continuity equation $$\frac{\partial \rho}{\partial \tau} + \frac{\partial (\rho u)}{\partial x} + \frac{\partial (\rho v)}{\partial y} + \frac{\partial (\rho w)}{\partial z} = 0 \tag{1}$$

Momentum Equation $$\rho \frac{\partial V}{\partial \tau} + \rho (V \cdot \nabla) V = -\nabla P + \rho g + \mu \nabla^2 V \tag{2}$$

Figure 4:
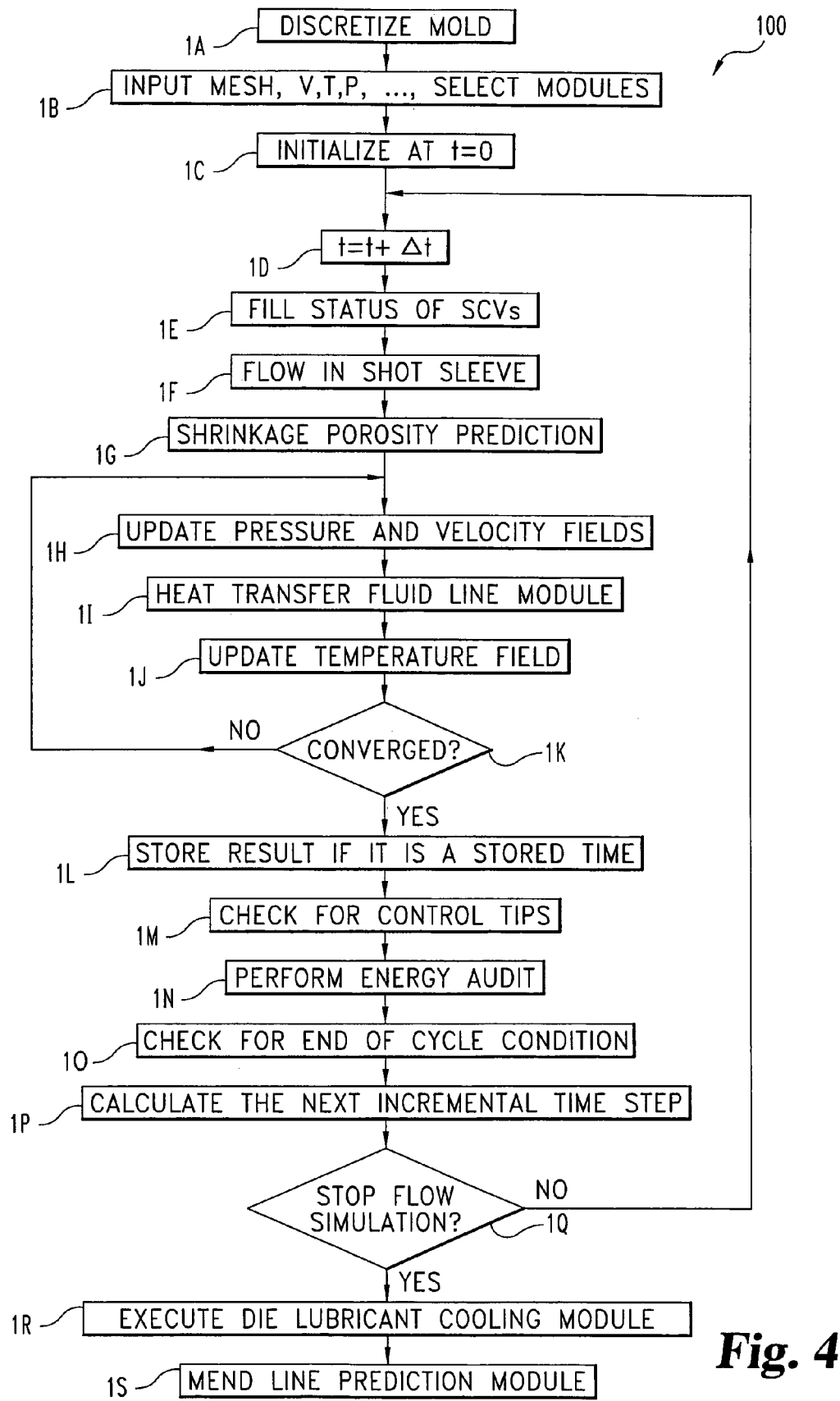
FIG. 4 is a flowchart of an embodiment of the overall solution sequence of the method of the present invention.

Energy Equation $$\rho C_p \frac{\partial T}{\partial \tau} + \rho C_p (V \cdot \nabla T) = \nabla (k \nabla T) + q'' + \Phi \tag{3}$$

where
 τ=time
 ρ=density
 P=pressure
 V=the velocity vector
 μ=viscosity g=gravity components
T=temperature
$C_p$=heat capacity
Φ=viscous heating source term
q"=heat flux Overall Simulation Sequence Referring to FIG. 4 which shows the flowchart of the overall simulation sequence 100, according to an embodiment of the present invention.

The method starts at 1A where the mold is discretized. A finite element mesh of the flow domain may be created by any conventional procedures. For example, U.S. Pat. No. 5,010,501 issued on Apr. 24, 1991 to Arakawa and titled "Three-Dimensional Geometry Processing Method and Apparatus Therefor", and U.S. Pat. No. 5,553,206 issued on Sep. 3, 1996 to Meshkat and titled "Method and System for Producing Mesh Representations of Objects", both disclose suitable procedures.

At 1B, the matrix representing the mesh, the thermal physical properties of the fluid, initial values of the variables and other boundary conditions (e.g., temperature, pressure, density, velocity, the fill status of the SCVs, CVs, etc.) are input. The user also selects the specific modules to be incorporated in the simulation and the required boundary conditions necessary for the operation of these modules are also input.

At the beginning of the simulation, the master clock is initialized that t=0, 1C. At each subsequent time step, the time variable t, is incremented by a user defined incremental time interval Δt, 1D. The user may fix Δt or allows it to vary. It is preferred that Δt is variable. A variable Δt permits control of the incremental changes of the dependable variables in each time step, such that the number of iteration necessary to achieve convergence is even throughout the simulation.

At 1E, the status of each sub-control volume is determined: as filled, partially filled, or empty. The instantaneous volume of melt in a sub-control volume is the sum of its initial volume and the net-influx of melt from the beginning until the time step being analyzed. The mass flux is computed from the fluid density, velocity, the fluxing area and time. The amount of melt in a nodal control volume is the sum of the melt in all the attached sub-control volumes. Fill fraction volume is easily computed by using simple book keeping on each control volume. In the illustrated embodiment of the method, the mass flux contributions around a nodal control volume j is computed using a gauss point velocity field ($u_g$, $v_g$, $w_g$) that:

$$J_j = \rho(u_g \omega_{xj} + v_g \omega_{yj} + w_g \omega_{zj}) \quad (4)$$

where $J_j$ is the mass flux around a nodal control volume j, ρ is density, and ω is the fluxing surface area.

The development of the gauss point velocity field is disclosed in an application entitled "Equal Order Method for Fluid Flow Simulation", filed on even day with the subject application by the same inventors, and hereby incorporated by reference in its entirety. Computing mass flux using the gauss point velocity field conserve mass to the truncation limits of the computation device (machine round-off levels). In addition, the method also uses a weighting scheme to compute mass flux to ensure global mass balance is conserved. For mass fluxes that are filling a nodal control volume, the upstream fill fraction is used to weight the filling flux. If a mass flux is draining a nodal control volume, then the downstream fill fraction is used to weight the flux. This weighting scheme is much like the donor-acceptor algorithm used by SOLAVOF.

While using the gauss point velocity field to compute mass flux is preferred, other scheme of computing mass flux, e.g. the SIMPLE and SIMPLER methods, may be used with the present method.

At this stage, the position of the free surface is also located. The volume fraction of the melt, $f_m$, is used to infer the position of the free surface. $f_m$, is defined as:

$$f_m = V_m/V \quad (5)$$

where

V and $V_m$ denote the volume of the control volume and the volume occupied by the melt, respectively.

In an element where the melt front exists, the volume fraction of the melt, $f_m$, on some of the nodes would be 1 and others less than 1. The free surface is defined as the surface where the volume fraction of melt, as interpolated from the nodes, is 0.5. However, since the exact position of the free surface is not known and some mass errors can accumulate. To avoid this error, the mass in the computational domain is re-normalized after each time step to ensure exact mass conservation.

After the filling status of the sub-control volumes are determined, the trapped air pockets are identified as a single or a group of empty sub-control volumes surrounded by filled or half filled sub-control volumes. These trapped air pockets are named and are assigned atmospheric pressure as their initial pressure. The position and melt fraction of these trapped air pockets are tracked and updated with each time step. The pressure within the trapped air pocket is calculated from the ideal gas law using the total mass flux into the pocket during a specific time interval. The updated pressure becomes the boundary condition for any in-filling event at the next iteration.

A computational domain is defined after updating the filling status of the nodal control volumes and the melt front. The purpose of defining a computational domain is to conserve computation time, only control volumes within the computational domain will be considered in the calculation. In the illustrated embodiment, the border of the computation domain is defined by joining nodes which are adjoining free-surface nodes, which have at least one filled sub-control attached. However, other criteria of defining a computational domain may be used.

At IF and 1G, the method determines whether the user optionally selects to incorporate the Flow in Shot Sleeve Module 200 and the Shrinkage Porosity Prediction Module 300 in the overall simulation. If the user has chosen to incorporate these modules, the step sequence of these modules, 200 and 300 will be integrated in the overall solution sequence, such that the momentum equations will be formed and solved with the appropriate terms and boundary conditions. The step sequences of modules 200 and 300 will be discussed in detail later.

At 1H, the momentum equations and the pressure equations are formed and solved. These equations govern the conservation of mass and momentum. Each momentum equation is made up of terms defined by the user. The terms commonly included for viscous, incompressible flow are inertia, advection, diffusion, body force and a pressure gradient. Using CVFEM techniques, an elemental matrix can be computed to approximate each term. These matrices are then assembled into a global momentum matrix and solved iteratively. In the illustrated embodiment, the global momentum equations are formed and solved by the Equal Order method.

The Equal Order method is a numerical method for solving the coupled momentum and mass conservation equation. The method defines a gauss point velocity vector as the average of the nodal velocity vectors. In essence, the expression of gauss point velocity is in the same order as the pressure gradient over each of the elements. Because the gauss point fluxing vector field is "centered" inside the pressure field defined at the nodes, no pressure checker boarding will occur. Additionally, because the gauss point velocities and pressure fields are evaluated from the same number of nodal positions, the accuracy of the solution is preserved. For linear triangular elements and linear tetrahedral elements, mass can be conserved to machine round-off levels. Using a two dimensional flow as illustration, the assembled momentum equations are written as:

$$\sum_{j=1}^{N} a_{ij} u_j = -\int_A \frac{\partial P}{\partial x} dA \quad \text{and} \tag{6}$$

$$\sum_{j=1}^{N} a_{ij} v_j = -\int_A \frac{\partial P}{\partial y} dA \tag{7}$$

where the $a_{ij}$ terms make up the influence coefficient matrix. Pulling the pressure gradients outside the area integrals, these equations are recast as:

$$u_i = \hat{u}_i - K_i \frac{\partial P}{\partial x} \tag{8}$$

$$v_i = \hat{v}_i - K_i \frac{\partial P}{\partial y} \tag{9}$$

where, $$K_i = \frac{1}{a_{ii}} \int dA, \tag{10}$$

$$\hat{u} = -\frac{1}{a_{ii}} \sum_{i \neq j} a_{ij} u_j \tag{11}$$

$$\hat{v} = -\frac{1}{a_{ii}} \sum_{i \neq j} a_{ij} v_j \tag{12}$$

and the nodal hat velocities, $\hat{u}_i$ and $\hat{v}_i$, are composed of nodal velocities $u_j$ and $v_j$ of neighboring nodes and contain no pressure term. The gauss point hat velocity $\hat{u}_g$, $\hat{v}_g$ and the gauss point coefficient term $K_g$ are defined as:

$$\hat{u}_g = \frac{1}{N_e} \sum_{j=1}^{N_e} \hat{u}_j, \tag{13}$$

$$\hat{v}_g = \frac{1}{N_e} \sum_{j=1}^{N_e} \hat{v}_j, \tag{14}$$

-continued $$K_g = \frac{1}{N_e} \sum_{j=1}^{N_e} K_j \tag{15}$$

and the gauss point velocities are expressed as:

$$u_g = \hat{u}_g - K_g \frac{\partial P}{\partial x} \tag{16}$$

$$v_g = \hat{v}_g - K_g \frac{\partial P}{\partial y} \tag{17}$$

In this expression for the gauss point fluxing velocities, $u_g$ and $v_g$, the pressure gradients, $\partial P/\partial X$, $\partial P/\partial Y$, are constant over the fluxing surface. For consistency, the terms $u_g$, $v_g$ and $K_g$ must all be constant over the fluxing surface as well.

By inserting the expression for the gauss point fluxing velocities, $u_g$ and $v_g$, into the continuity equation (1), a Poisson equation for pressure is obtained. The pressure equation is expressed as:

$$\nabla k \nabla p = \frac{\partial \hat{u}}{\partial x} + \frac{\partial \hat{v}}{\partial y} \tag{18}$$

Integrating this equation over the area of the fluxing surface of the eelement, the pressure field can be expressed as:

$$\int_A \nabla k \nabla P dA = \int_A \left[ \frac{\partial \hat{u}}{\partial x} + \frac{\partial \hat{v}}{\partial y} \right] dA \tag{19}$$

Using Green's theorem, these area integrals are converted to line integrals, $$\int_\sigma \left[ k_g \frac{\partial P}{\partial x} \right] dy + \left[ k_g \frac{\partial P}{\partial x} \right] dx = \int_\sigma \hat{u}_g dy - \hat{v}_g dx \tag{20}$$

Using the gauss point hat velocities $\hat{u}_g$, $\hat{v}_g$ and $K_g$ previously defined, the Poisson pressure equation can be assembled and solved to determine the pressure field.

The nodal velocities, $u_i$ and $v_i$, and the gauss point velocities, $u_g$ and $v_g$, are computed by inserting the newly derived pressure field and $\hat{u}_i$, $\hat{v}_i$, $K_i$, $\hat{u}_g$, $\hat{v}_g$ and $K_g$ in the momentum equations.

While the Equal Order method is preferred, it should be understood that other methods which derive and solve the discretized form of the momentum equation may be used without deviating from the spirit and scope of this invention. Examples of the other known methodology are the SIMPLE and SIMPLER methods of Baliga and Patankar, (in "A Control Volume-Finite Element Method for Two Dimensional Fluid Flows and Heat Transfer", in *Numerical Heat Transfer*, 6, 245–261 (1980)), the Galerkin's method, and the Newton Raphson method.

At 1I, the method determines whether the user has elected to incorporate the HTF Line Module 400 in the simulation. If the user made the election, the step sequence of module 400 will be inserted before 1J of the overall simulation sequence 100. The sequential steps of the HTF Line Module 400 will be discussed later. The heat flux from the die to the heat transfer fluid, a result of module 400, will be used to predict the die temperature.

After solving the pressure and velocity field, the method proceeds to solve the temperature fields for both the die and the melt by solving the energy equation (3). The energy equations are made up of terms that are defined by the user. Preferably, the energy equation for the melt includes terms for inertia, advection, diffusion, volumetric heat source, viscous heating, and coincident interface heating. Additional, Dirichlet and Neumann boundary conditions should be included as well. The energy equation for the die preferably includes terms for conduction and radiation. Using CVFEM techniques, an elemental matrix is computed to approximate each term. These matrixes are then assembled into a global energy matrix. After the assembly process, the left hand side can be represented by a coefficient matrix operating on a temperature solution vector. The right hand side is made up of a source term vector. This set of discretized form of the energy equations is solved to yield the temperature at each node. Fraction of solid information is computed using a temperature versus fraction of solid curve. The curve can be empirically determined.

At 1K, the method checks for convergence of the dependent variables. An iterative process is said to have converged when further iterations will not improve the accuracy of the dependent variables. In practice, the iterative process is terminated when the desired accuracy is obtained. Although the computed velocity field at the gauss points conserves mass to machine round-off at every iteration, the mometum equations are non-linear and therefore iterations are required to refine the momentum balance. In this technique, the flow equations and energy equations are iterative solved until all velocity and temperature values converge to a user supplied tolerance. If either of the nodal or gauss point velocities or temperatures, Ti has not converged, the method returns to 1H where the momentum and energy equations are solved and iterated again using the updated nodal and gauss point velocities and Ti. If the velocity and temperature fields have converged, the method then proceeds to the next stage.

At 1L, the decision is then made whether or not to store the calculated parameters and which parameters to store. These decisions are based on the requirements of the user of the method—results can be stored every time step, every other time step, or some other increment desired by the user. Preferably, the parameters being stored include: time, velocities, pressure, die and melt temperatures, solid fraction, shrinkage porosity, heat transfer fluid temperature and the free surface position. These values may also be output.

At 1M, the method checks for control trips defined by user. If a trip condition has been reached, the method will follow a user-defined sequence of events. In most cases, trip conditions are used to signal the computer program to make boundary condition changes or to begin or end the use of a particular module.

At 1N, the method performs an energy audit, such that the heat flux of all the components may be integrated over the time step. The energy audit provides a quantitative understanding of the net energy exchange between components such that the user may assess whether the appropriate process settings were provided for the simulation.

At 1O, the method checks for end of cycle conditions. If the simulated time has reached the end of cycle time, then the initial conditions are re-applied to the model and a new cycle is simulated. This allows for die heat-up transients to be studied.

At 1P, the method allows the user to define the next incremental time $\Delta t$. If user does not define a incremental time $\Delta t$, the method will calculate the next time interval based on the number of iterations performed to obtain convergence for the present time step.

At 1Q, the method then checks to see if the stop flow simulation time has been reached. The stop flow simulation time is a user-defined value. If the stop time has not been reached, the method returns to incrementing the time at 1D, and proceeds with another cycle. If the stop flow simulation time has been reached, then the mold filling portion of the simulation is completed. However, the thermal portion of the simulation continues if the user elected to incorporate the Die Lubricant Cooling Module 500 in the simulation at 1R, the operation sequence of module 500 will be incorporated into the overall simulation sequence 100. The sequential operations of the Die Lubricant Cooling Module 500 will be discussed later.

At 1S, the user has the option to simulate for mend line formation. Mend line prediction is a post-processing activity and does not interact with the computational cycle of the overall simulation sequence 100. The sequential operations of the Mend Line Prediction Module 600 will be discussed later.

Flow in Shot Sleeve Module

Simulating the flow in shot-sleeve model established the initial pressure, temperature and velocity vector field of the flow before the mold-filling event occurs. The pressure field can be used to establish the dwell time, dwell pressure and the thickness of the biscuit (material left in shot sleeve after the mold is filled) required for maintaining the continuity of mass flux. Dwell time and dwell pressure are important process parameters for avoiding the formation of shrinkage porosity. Furthermore, the module allows the user to set initial temperature field of the billet and monitor the movement of hot and cold spots as the mold cavity is filled.

When the program runs, the position of the ram in each time interval is monitored. The ram displacement is used to determine the amount of volume of molten metal displaced from each control volume adjacent to the ram. This volume of metal is then incorporated in the continuity and momentum equations to calculate the pressure and velocity fields. The temperature field is determined from the energy equation.

Figure 5:
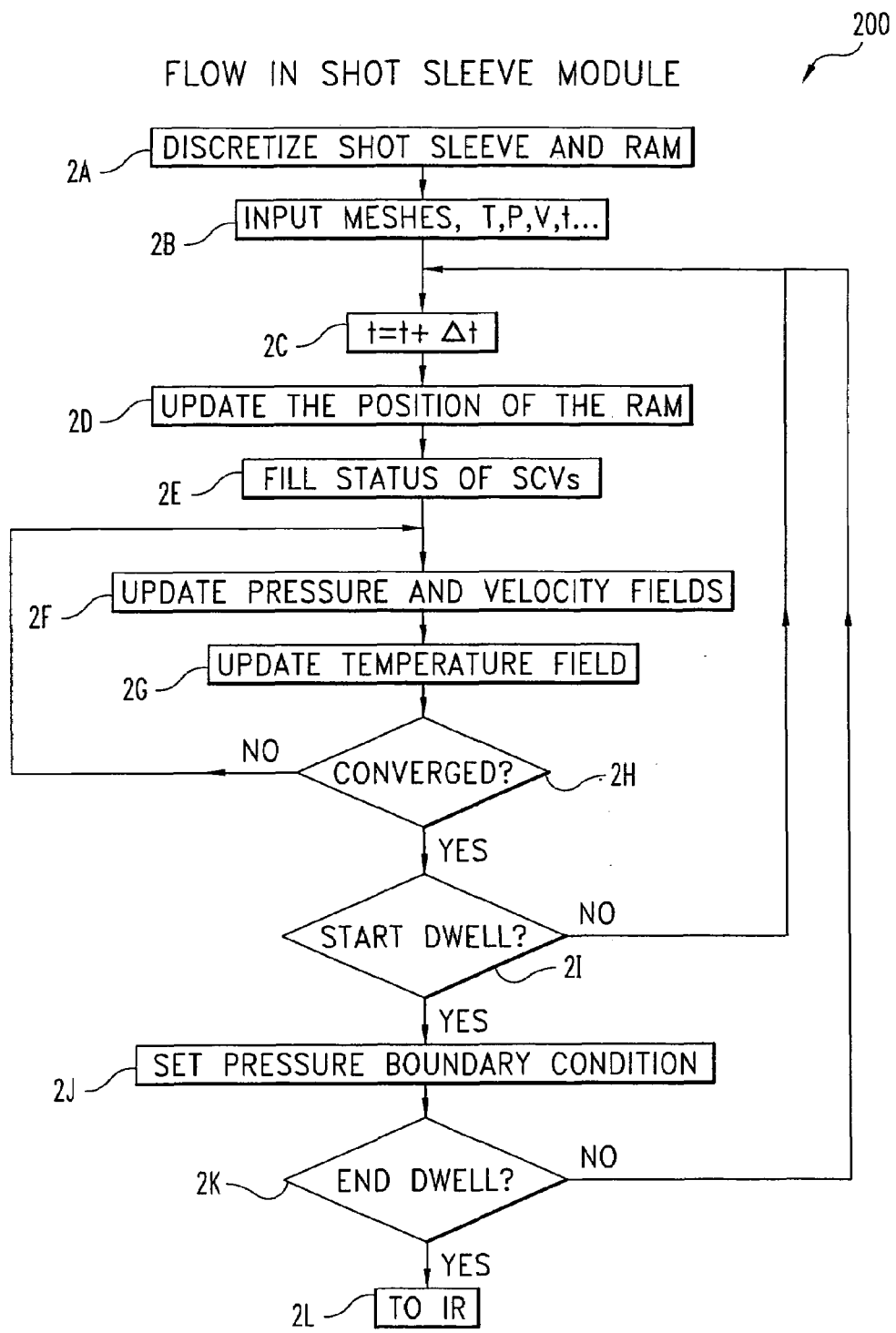
FIG. 5 is a flowchart of an embodiment of the Flow in Shot Sleeve Module of the method of the present invention.

Referring now to FIG. 5 which shows the flowchart of an embodiment of the Flow in Shot Sleeve Module 200 of the present invention. The sequential operation of Flow in Shot Sleeve Module 200 is highly integrated into the overall simulation sequence 100. While the module 200 is depicted in FIG. 5 as a complete, independent routine, it is so depicted for conceptual understanding and demonstrative clarity. It is contemplated and understood that it will be readily apparent to those skilled in the art that the sequential operation of Flow in Shot Sleeve module 200 is interspersed between, and relies upon the operation of the overall simulation sequence to function.

The module starts at 2A with the inputting of the geometric model of the shot sleeve and the ram. The shot sleeve and the ram are then meshed into a plurality of finite elements and the matrix representing the mesh is entered. At 2B, the user may define a set of process parameters and boundary conditions comprising: the initial position of the ram, the velocity profile of the ram, the volume fraction of the melt in the mold reaching when the speed control switches from velocity to dwell pressure, the dwell pressure profile of ram, the length of time that the ram is to be held at dwell pressure, initial volume and temperature distribution of billet. The thermal physical properties of the material are also input.

At 2C, the master clock advances by an incremental time Δt. The time clock is the same as 1D of overall solution sequence 100, and the incremental time Δt is also the same as the overall solution sequence 100.

At each time step, the position of the ram is updated, 2D. As the ram always moves in its axial direction, the ram position is determined from the user define ram velocity profile and the time increment Δt.

From knowing the ram position and the stored matrix of the shot sleeve, the method identifies the control volumes which have been crossed by the incremental advancement of the ram using simple book keeping techniques (2E). The control volumes of the shot sleeve, which are occupied by the ram, are deleted from the computation domain.

Updating pressure and velocity fields at 2F is the same operation as 1H of the overall simulation sequence 100. The incorporation of Flow in Shot Sleeve Module 200 modifies the boundary conditions for the computation of the velocity and pressure fields. The volume of molten metal displaced by the advancing ram is computed from the geometry of the shot sleeve and the incremental ram positions. This volume of molten metal is equated to the mass flux across the fluxing faces of the control volumes. The mass flux is inserted into the continuity equation to form a Poisson equation for pressure. The pressure equation is solved to obtain the pressure field.

Using the updated pressure field, the global momentum equations are solved for the velocity field. The momentum equations are formed and solved by the Equal Order method as previous described in 1H of overall solution sequence 100. It should be understood that while the Equal Order method is preferred, other method of forming and solving the momentum equation might be used without deviating from the spirit and scope of the invention.

Updating temperature field at 2G is the same operation as 1J of the overall simulation sequence 100. Again, the incorporation of Module 200 modifies the boundary conditions for the computation of the temperature field. In regions where coincident elements remain at their initial positions, aligning-coincident heat transfer is assumed, which is similar to that described in 1J of overall solution sequence 100. Non-coincident (or non-aligning) heat transfer is also present and results from the motion of the ram such that the elements of the shot sleeve or the melt in contact with the ram are constantly changing. The method accounts for this unique heat transfer by vigorous book keeping of the interfacial boundary.

The method checks for convergence of the velocity and temperature fields at 2H (same as 1K of overall simulation sequence 100). If the velocity field or temperature field has not converged, the method returns to 2F for another iteration using updated pressure, velocity and temperature values. If the velocity and temperature has converged, the method checks whether the criteria for the ram control to switch from speed to dwell have been reached, 2I. Preferably, the criterion for switching is the fill fraction of the mold. The user may select the value of the criterion; preferable, it is set at 99% fill. Alternatively, the user can also choose a time or ram position to switch ram speed control into pressure control.

When in dwell, the pressure of the ram forms the boundary condition of the elements immediately adjacent to the ram, 2J. The pressure field is updated. The motion of the ram is now updated based on the amount of material pushed out from those adjacent control volumes. The method then checks whether end time for dwell has been reached, 2K. The end time for dwell is selected by the user. If end time for dwell has not been reached, the method returns to 2C and advances a time increment Δt and the pressure, velocity field are updated. At dwell, the driving force for melt flow is pressure rather mass flux. If end time for dwell has been reached, the method continues to 1R of overall solution sequence 100 (2L).

Shrinkage Porosity Prediction Module

The porosity prediction module 300 uses a coupled thermal-flow model to predict the formation of shrinkage porosity. First, the thermal-flow model provides a prediction of temperature, pressure and velocities within the region occupied by the metal and the die. Under the constraint of the conservation of mass, a region where alloy is becoming denser over time will cause a very low pressures in the momentum equation if the flow resistance in the surrounding matrix is large enough to retard material from filling in. As the local pressure approaches vacuum, the region would not be able to suck any additional material from the surrounding matrix to compensate for its shrinkage. Any further shrinkage will then produce porosity in that region. Therefore, shrinkage porosity can be calculated directly by incorporating porosity and density variation in the mass conservation equation. This process can be undertaken at each time level to produce a time history of porosity at each position in the model.

Figure 6:
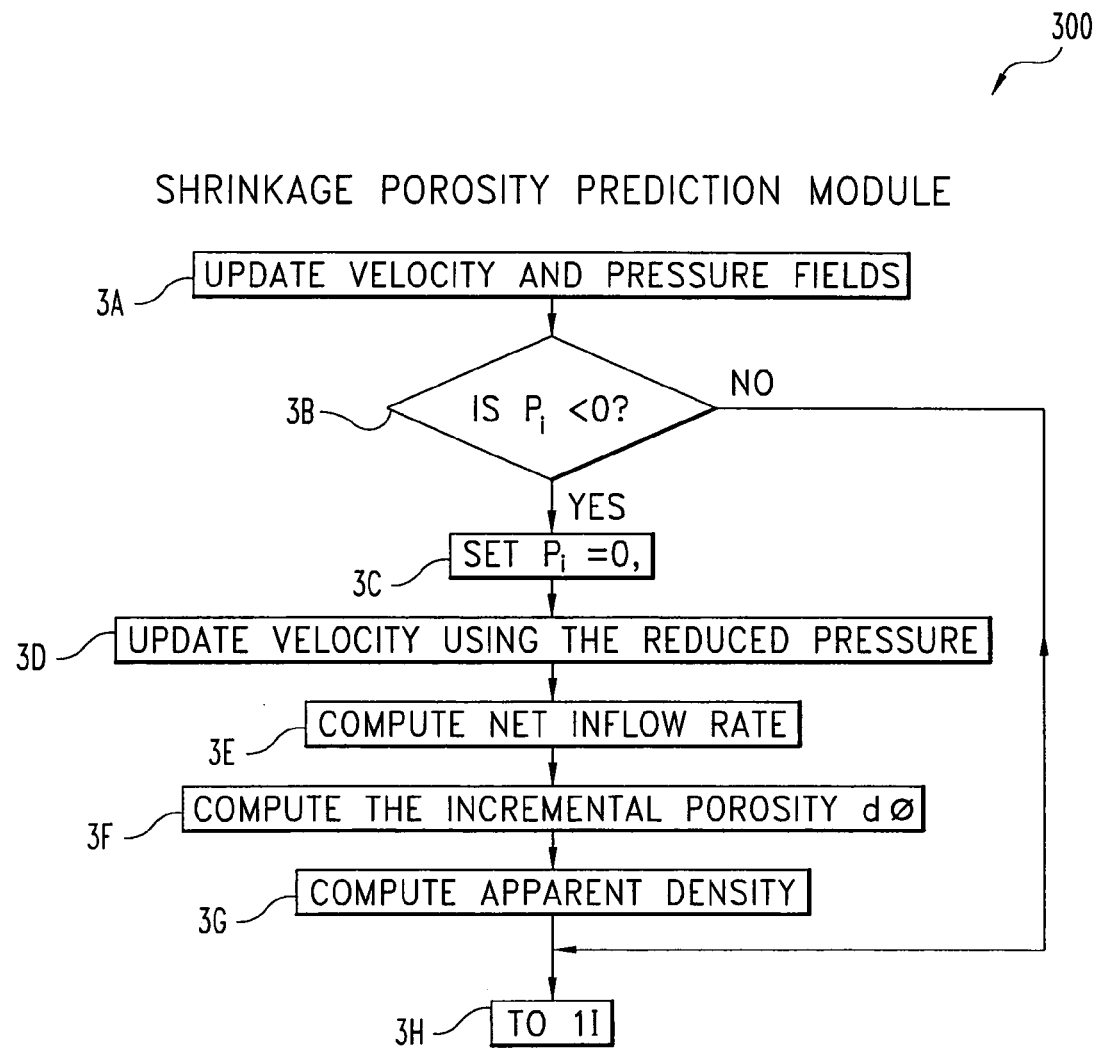
FIG. 6 is a flowchart of an embodiment of the Shrinkage Porosity Prediction Module of the method of the present invention.

Referring now to FIG. 6 which shows the flowchart of an embodiment of the shrinkage porosity prediction module 300 of the present invention.

At 3A, the momentum equations are discretized and expressions for the velocity components are formed as described in 1H of overall simulation sequence 100. The continuity constraint is modified to include the effects of porosity. The modified continuity constraint is expressed as:

$$\frac{\partial \beta u}{\partial x} + \frac{\partial \beta v}{\partial y} + \frac{\partial \beta w}{\partial z} + \frac{\partial \beta}{\partial t} = 0 \qquad (21)$$

where
  $\beta = (1-\phi)\rho$ apparent density of the alloy
  x, y, z=three components of the coordinate system
  t=time
  u, v, w=three velocity components
  $\phi$=volumetric fraction of porosity (0— no porosity and 1–100% porosity)
  $\rho$=theoretical density of the alloy as function of temperature The velocity components are inserted into the modified continuity constraint to form the Poisson equation for pressure. This equation is solved to determine the pressure at each node within the computational domain.

At 3B, the pressure field is analyzed. Shrinkage porosity forms or increases when the control volume's pressure decreases to vacuum. The control volumes having negative pressures are identified and the pressure of those control volumes are re-set to zero, 3C. Using the reduced pressure gradient, the momentum equation is solved and the velocity field updated, 3D. At 3E, the volumetric net inflow rate, $\dot{v}$, in each control volume with negative pressure is evaluated. The reduced pressure gradient yields a smaller net flow rate than when the pressure in the specific control volume was negative. The smaller net flow rate may be rationalized as accounting for the space taken up by the voids.

At 3F, the increment in porosity within the control volume is computed by taking the difference between the densification rate and the smaller net flow. The following equation is used to estimate the increase of porosity within the control volume:

$$d\phi = \frac{1}{\rho_s}\left(\frac{\partial \rho}{\partial \tau} - \frac{\dot{v}}{V}\right)d\tau \quad (22)$$

where
- $\rho_s$ is the theoretical density at solidus temperature
- $\rho$ is the theoretical density
- V is the volume of the control volume
- $\dot{v}$ is the net flow rate of material coming into the control volume
- $d\tau$ is the incremental time step.

At 3G, the apparent density $\beta$, where $\beta=(1-\phi)\rho$, at each node is calculated using the updated porosity value $\phi$. The updated apparent density $\beta$ is used in computing the velocity and pressure fields in the next time step. A time history of shrinkage porosity at each control may therefore be established. At 3H, module 300 continues to 1I of overall simulation sequence 100.

Heat Transfer Fluid Line Model

Figure 7:
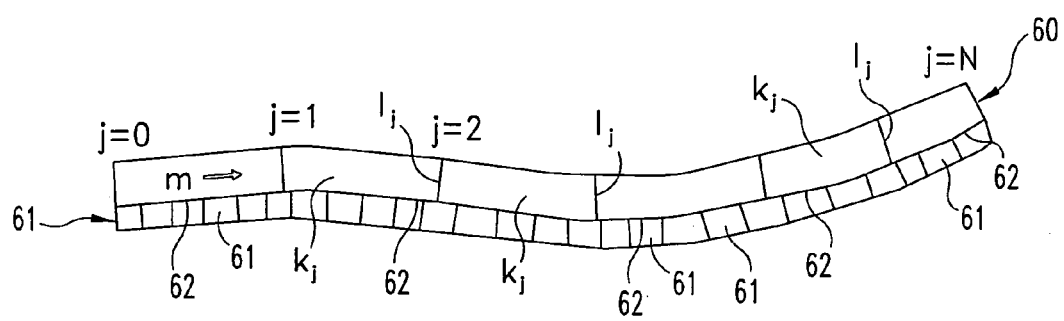
FIG. 7 is a schematic drawing of the heat transfer fluid line showing the transfer line segments in relation to the mold faces.

The HTF line module 400 simulates the heat flux between the die surface and the heat transfer line, such that the temperature field may be determined accurately and processing conditions may be set properly. FIG. 7 shows a schematic diagram of the heat transfer line 60 in relationship to the die elements 61. The entire heat transfer line 60 is divided into a number of linear segments $k_j$, where j=1,2, ... N. Each segment $k_j$ is associated with a known set of die element surfaces 62 at where the heat transfer from the die to the cooling channel is accounted. Each segment $k_j$ is bounded by an upstream node $l_{j-1}$ and a downstream node $l_j$, named in relation to the flow direction m. The average temperature distribution within each segment $k_j$ is linearly interpolated from the nodal temperature at its two ends. As the HTF lines are typically drilled with circular cross section, the axisymmetric velocity and temperature distribution of the HTF can be calculated based on the well-established analytic solutions. This model, thus, simplified a three-dimensional problem to a one-dimensional problem in which the solution is manageable.

The governing equation for the this heat transfer is an implicit form of a one-dimensional energy equation:

$$\frac{A_{flow}L\rho C_p}{\Delta \tau}\left[\frac{T_j + T_{j-1}}{2} - \frac{T_j^0 + T_{j-1}^0}{2}\right] = \\ -\dot{m}C_p(T_j - T_{j-1}) + \sum_{k=1}^{N_f} h_k A_k\left(T_{mk} - \frac{T_j + T_{j-1}}{2}\right) \quad (23)$$

where
- $A_{flow}$=the cross sectional area of the HTF line
- $\Delta\tau$=time step
- $h_k$=convection heat transfer coefficient between the HTF and the die in segment k
- $A_k$=circular area of the HTF line in segment k
- $T_{mk}$=mean die temperature in segment k
- $T_j$=temperature of the HTF at node j at the end of a time step
- $T^0_j$=temperature of the HTF at node j at the beginning of a time step By defining the following terms, $$I = \frac{\Delta \tau}{A_{flow}L\rho C_p} \quad (24)$$

$$E = \sum_{k=1}^{N_j} h_k A_k, \quad (25)$$

$$E_T = \sum_{k=1}^{N_f} h_k A_k T_{mk} \quad (26)$$

an update of the cooling channel temperature, $T_j$, can be expressed as, $$T_j = (cbT_{j-1})/\alpha \quad (27)$$

where, $$\alpha = 1 + I(E + 2\dot{m}C_p) \quad (28)$$

$$b = 1 + I(E2\dot{m}C_p) \quad (29)$$

$$c = 2IE_T + T^0_j + T^0_{j-1} \quad (20)$$

The method of the present invention solve the above energy equation numerically using a tri-diagonal solver. At each time step, the Reynolds number (Re), Prandtl number (Pr), Nusselt number (Nu), and the corresponding heat transfer coefficient $h_k$ on each element surfaces of the heat transfer line is calculated based on the user defined volume flow rate, thermal physical properties of the HTF, and the updated HTF temperature. The heat flux exchanged between the HTF and the die is calculated on each die element surface 62 from the heat transfer coefficient $h_k$, the local temperature difference between the HTF and the die, the element surface area and the time step. With the heat flux of the die element surfaces 62 within each line segment $k_j$, the HTF's temperature at the upstream node $l_{j-1}$, the volume flow rate and thermal physical properties of the HTF, the HTF's thermal energy, and setting the boundary condition that the temperature of the first node $T_0=T_{inlet}$, temperature at the downstream node $T_1$ can be calculated. By this approach, the analytical/empirical correlation between Re, Pr and Nu and the variation of the HTF's flow rate, temperature and viscosity can be incorporated to predict the heat transfer accurately without heavy increase in the computation steps.

Figure 8:
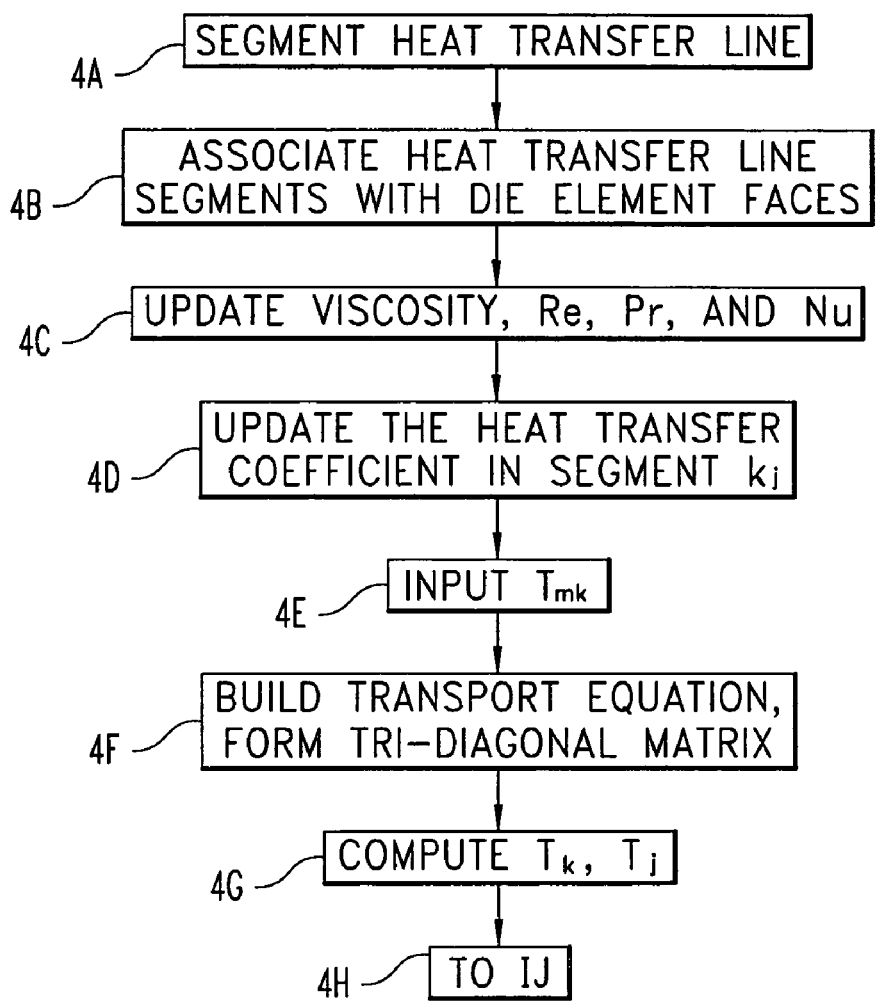
FIG. 8 is a flowchart of an embodiment of the Heat Transfer Fluid Line Module of the method of the present invention.

Referring now to FIG. 8 which shows the flowchart of an embodiment of the Heat Transfer Line Module 400 of the present invention.

At 4A and 4B, the method identifies all of the die element surfaces 62 associated with the HTF lines from the imported finite-element mesh of the entire die and user specified element edges of the inlet and outlet. Then, these HTF element surfaces are grouped sequentially, based on their flow distance from the inlet, into a number of segment $k_j$ where j=1, N. The number of segments, N, is determined by the user based on the total length of the HTF line.

At 4C, based on the initial temperature $T_k$ of the heat transfer fluid at the beginning of a time step, the method updates the viscosity, $\mu$, of the HTF at segment $k_j$, from a look-up table which contains empirically determined viscosity and temperature relationship for the fluid. From viscosity, Reynolds number, $Re=\rho vd/\mu$, and Prandtl number, $Pr=C_p\mu/k$, are calculated. The Nusselt number, Nu, being a function of the Reynolds and Prandtl numbers can also be updated. The relationship between the between Re, Pr and Nu numbers can be analytically/empirically determined for a specific fluid.

At 4D, the heat transfer coefficient $h_k$ in segment $k_j$ is calculated from the Nusselt number using the following relationship:

$$h_k = Nuk/d$$

where $h_k$=heat transfer coefficient of the HTF in segment k
k=thermal conductivity
d=diameter of the line At 4E, the value of $T_{mk}$ is input into the calculation. $T_{mk}$ is the average nodal temperature of the set of die elements 61 associated with segment k, of cooling line. The nodal temperatures of the die elements 61 are read from the temperature field of a previous iteration.

At 4F, the transport equation is built, a tri-diagonal matrix is formed for the HTF temperature. Given the boundary condition that $T_{j=0}=T_{inlet}$, the average temperatures at every node $1_j$ is computed.

At 4G, the updated temperatures are then used as boundary conditions to calculate the heat flux between the die and the HTF to solve the temperature field in the cavity and the die at 1J of overall simulation sequence 100 at 4H.

Die Lubricant Cooling Module

The Die Lubricant Cooling Module 500 calculates the amount of heat removed from the die by spraying of lubricant after the part was ejected. In this module, the element surfaces covered by the lubricant spray are identified mathematically by emanating a spray cone from the nozzle's position toward the mold surface. By comparing the relative position of the element surfaces on the mold cavity with the spray cones, those element surfaces covered by the spray can be identified. If the spray nozzle moves, the position of the spray cone and the corresponding sprayed element surface will be updated for every time step. The cooling coefficient on an element surface is determined empirically. In actual set up, the user only needs to define the location, angle and motion path of each spray nozzle, nozzle type, spray pressure and flow rate. The program will automatically identify and assign a time-dependent convection-cooling coefficient at every time step on those element surfaces intercepted by the spray cone. With this function, the user can quickly change the spray nozzle, spray pattern and spray parameters to evaluate their impact on die temperature and product's quality.

Figure 9:
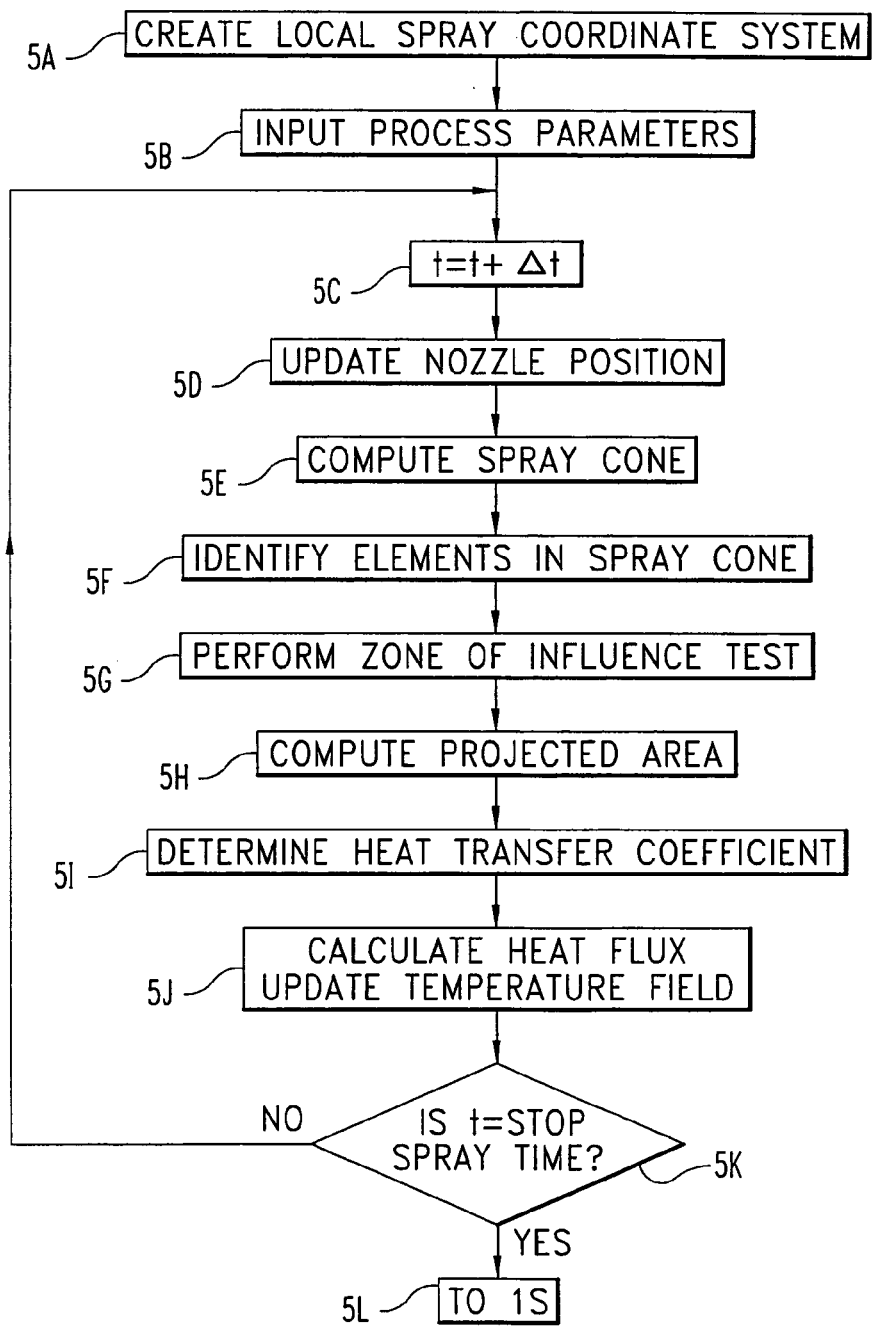
FIG. 9 is a flowchart of an embodiment of the Die Lubricant Cooling Module of the method of the present invention.

Referring now to FIG. 9 which shows the flowchart of an embodiment of the Die Lubricant Cooling Module 500 of the present invention. After stop flow time for the flow portion of the simulation has been reached, the die opens and the part is ejected. The matrix of the open die is input for the Die Lubricant Cooling Module 500. At 5A, a local coordinate system is established using the nozzle location as the origin, the major and minor axis of the nozzle as the x and y coordinate and the axis extend from the nozzle to the die face as the z-axis. A transformation matrix is used to place each element of the three-dimensional mesh that makes up the mold wall surface into the local spray coordinate system. Alternatively, the cone can also be represented in the global coordinate of the imported finite-element mesh.

At 5B, the user is required to specify the physical properties and position of each spray nozzle, e.g. nozzle shape, the major and minor axis of the nozzle and its distance from the die surface, and the path of travel. In addition, the user has to specify the flow rate and the spray pressure. The user can vary the parameters to achieve different spraying conditions. For example, to change nozzle shape to accommodate a different spray pattern, or the spraying time. Preferably the user would set the time of the spray and travel path of the nozzle so that the lubricant would spray the entire mold surface.

The Die Lubricant Cooling Module 500 is integrated into the global energy balance of the simulation. The master clock at 1C of overall simulation sequence 100 controls the operation of this module, 5C.

At 5D, the nozzle's location in the local coordinate system is input. At 5E, from the shape of the nozzle, the major and minor axis of the nozzle, and the distance from the surface, the method simulates the shape of the coverage of the spray or the spray cone. It should be understood that the shape of the spray cone depends on the shape of the nozzle, which can be any shape. Preferably, the shape of the nozzle is circular or elliptical. At 5F, the elements facing the nozzle are identified. The identification is accomplished by a visual test, which the nozzle is placed at the eye position and viewed along the Z-axis of the local coordinate system towards the die. The die element faces which are in front of the spray and having a normal vector such that they face the spray are selected. Upon the element surfaces that are selected, a second test is performed to determine which element faces are actually exposed to the spray (i.e., within the cone of influence), instead of being hidden behind other die features, e.g., a moving core. The test is:

$$\text{if } \frac{x_l^2}{a^2} + \frac{y_l^2}{b^2} < z_l^2, \qquad (31)$$

then, the element face is determined to be inside cone of influence. The subscript, l, is used to denote the local coordinate system as defined by the spray.

At 5H, if a face is in the cone of influence, the face is projected through a hemispherical surface to compute the fraction of the total view space that this face occupies. The hemispherical projection technique is well-documented in radiation heat transfer literature (e.g., *Heat Transfer—A Basic Approach*, M. N. Ozisik McGraw Hill, 1985.) Once the projected area of an element face is known, the heat transfer coefficient at 5I may be look-up from a table and the heat flux from the element face may then be computed at 5J. The heat flux is inserted into the energy equation to update die temperature for the subsequent process.

The look-up table is constructed empirically. The following is an example of the construction of such a table. First the volume of spray reaching the projected area of the element face is computed by the expression:

$$Q_f = Q_s \eta_s f_{hp} \qquad (32)$$

$Q_f$=volume of spray reaching mold face,
$Q_s$=Volumetric spray flow

Where, $\eta_s$=Spray carry out efficiency $f_{hp}$=fraction of the view space

Then spray experiments can be conducted where a known volume of lubricant is sprayed on a heated flat plate. All thermal physical parameters of the flat plates are known. Preferably, the plate is of similar material as the die. The temperature drop resulted from the spray is measured, and the heat transfer coefficient computed. The volume of spray used versus heat transfer coefficients are stored. The table can then be used to look up heat transfer coefficient when the volume of spray reaching the element faces of the die is known. While a suggestion is made as how to establish a look-up table for heat transfer coefficient, other methods, empirical or numerical, of determining a heat transfer coefficient from the projected area of a die element face may be used.

After the heat flux and die temperature are calculated, the method checks whether a user defined stop spray time has been reached at 5K. If stop spray time has not been reached, the sequence returns to 5C, and time is incremented and the spraying sequence repeated. If stop spray time has been reached, the Die Lubricant Cooling Module 500 is completed. At 5L the simulation continues 1S of overall solution sequence 100.

Mend Line Prediction Module

The Mend Line Prediction Module 600 simulates the location of the mend line in the flow. Module 600 predicts the position of the mend from the data collected during a mold filling simulation. The module is executed after the completion of the simulation. It is a post-processing activity and does not interact with the computational cycle of the overall simulation sequence 100.

Along the free surface of the melt front, mathematical points are created to represent material particles. The position of each particle is tracked. At each time step, particles are advected to their new position based on the calculated melt velocity on the previous position. After the simulation is completed, the user can display the distribution of these particles which were assigned different colors or symbols denoting the time of birth (when they were added) or local temperature. In this way, mend lines can be identified.

Figure 10:
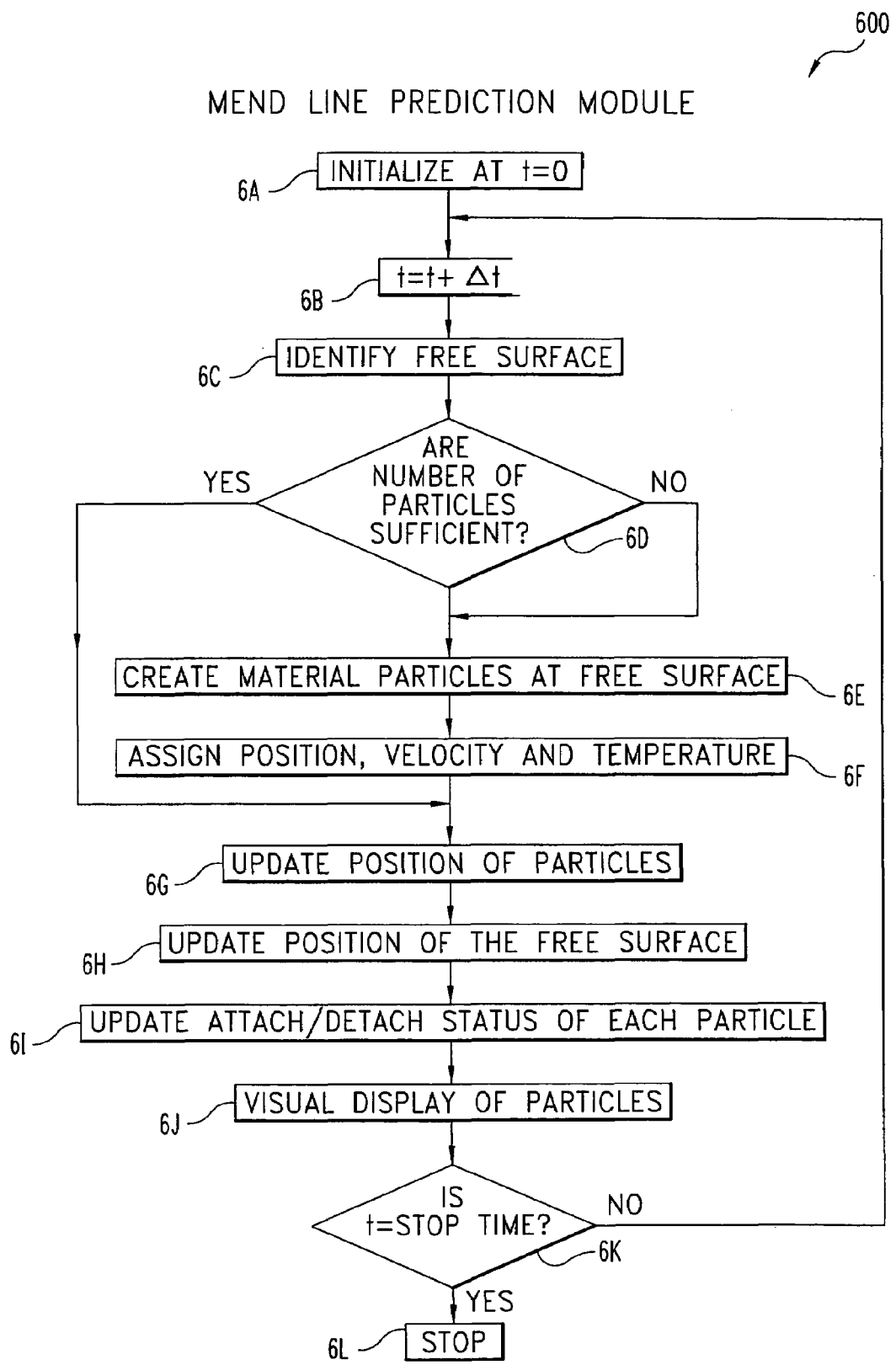
FIG. 10 is a flowchart of an embodiment of the Mend Line Prediction Module of the method of the present invention.

Referring now to FIG. 10 which shows the flowchart of an embodiment of the Mend Line Prediction Module 600 of the present invention. At start, a clock is initialized, user sets start time and end time for the simulation. User may choose to predict the formation of the mend line only at a specific time period of the overall simulation at 6A.

The user may set the incremental time $\Delta t$ between time steps. User may follow the same incremental time, $\Delta t$, used in the simulation where the data is collected. Alternatively, the user may define the time increment according to the resolution of the motion of the melt desired, 6B.

At 6C, the position and shape of the melt front in each partially-filled control volume is mathematically identified based on the volume fraction of the melt, $f_m$. The volume fraction of the melt is defined as:

$$f_m = \frac{V_m}{V} \quad (35)$$

where $V_m$ is the volume of the control volume occupied by the melt

V is the total volume of the control volume

In one embodiment of the present invention, the free surface of the melt front is defined at $f_m$=0.5. The elements where the melt front exists are first identified from the volume fraction of their nodes. In an element where the melt front exists, the volume fraction of the melt on some of the nodes would be larger than 0.5 and others less than 0.5. The volume fraction of melt in each control volume is updated based on the incremental net inflow of melt during the iterations in every time step.

At 6D, the module then determines whether the number of particles at the melt front is sufficient. The module determines the distance between the attached particles and the melt front, if the distance between a particle from the free surface of the melt front is larger than a user defined value, the particle is considered detached. If the number of particles on a melt front surface in an element is lower than the user-specified number density, the module will add new particles to the free surface. In addition, the method assigns different colors or symbols to track these newly added particles. If the number of particle at the free surface is judged sufficient, the module continues to 6G.

While a distance criteria is used for adding particles, other criteria, such as a range of fraction of liquid, particle density, etc., may be used to determine whether a particle is still attached to the melt front without deviating from spirit and scope of the invention.

At 6E, new particles are created/added as mathematical points along the free surface of the melt front. Each particle is assigned a position, $x_p$, $y_p$, $z_p$ a temperature $t_p^\circ$ and a velocity $V_o^\circ$ which are equal to the velocity and temperature of the associated melt front, as interpolated inside an element from the nodes. Once created, the position, temperature and velocity of each particle are stored and will be tracked continuously, 6F.

At 6G, the position of all particles are updated. At each time step, the particle is advected to a new position. The new position is updated using the local velocity vectors.

$$x'_p = x_p + v_x \Delta \tau$$

$$y'_p = y_p + v_y \Delta \tau$$

$$z'_p = z_p + v_z \Delta \tau$$

where ($x'_p$, $y'_p$, $z'_p$) is the latest position of the particle, and $v_x$, $v_y$, $v_z$ are the velocity component of the particle. During this advection process, the particles are constrained such that they can not pierce the boundaries of the model. The new position is stored.

At each time step, the average position of the free surface within each element is updated. At each element that contains a free surface, the intersection of the $f_m$=0.5 surface with the edges of the element is computed. The resulting collection of points is used to define a polygon whose centroid is denoted by $x_{fs}$, $y_{fs}$, $z_{fs}$, 6H.

At 6I, the method determines the attach/detract status of each particle. The method compares the latest position of each particle ($x'_p$, $y'_p$, $z'_p$) to the average position of the free surface ($x_{fs}$, $y_{fs}$, $z_{fs}$). If the particle is within a user-defined tolerance of the free surface points, then the particle is defined as an attached particle. If the particle is outside the defined tolerance of the free surface points, then it becomes a detached particle. The detached particles are labeled with different color/symbol for easy visual identification.

At 6J, the particle locations are rendered to the computer's screen for visual analysis. The attached and detached particles are distinguished by color/symbols. Based on the display, the user can easily identify the mend line, where particles of different colors meet, its final location, if the melt continue to flow after mending, and the quality of mending based on the material's temperature, pressure and level of mixing (particles of different colors blended together).

At 6K, the method checks for the time. Stop time is a user defined variable. If stop time has not been reach, returns the module to 6G for simulation at a different time step. If it is stop time, the simulation is completed at 6L. User may output result of the simulation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for simulating thermal flows for casting/molding processes, comprising:
   selecting simulation modules for incorporation in an overall simulation sequence for execution by a computer, said modules including a Flow in Shot Sleeve Module, a Shrinkage Porosity Prediction Module, a Heat Transfer Fluid Line Module, and a Die Lubricant Cooling Module;
   inputting initial parameter value and process conditions for the simulation sequence;
   performing the simulation sequence with the computer in accordance with the parameter value and process conditions to simulate thermal flow for a casting or molding process, including:
      (a) discretizing flow domain into elements having nodes and fluxing surfaces;
      (b) incrementing the time by an incrementing time step;
      (c) updating material balance;
      (d) forming and solving momentum equations, and updating velocity and pressure fields;
      (e) forming and solving energy equations, and updating temperature field;
      (f) checking if parameters have converged, returning to step (d) if they have not;
      (g) determining whether an end-simulation event has occurred, returning to step (c) if it has not; and
      (h) deciding whether to execute post-process simulation modules with the computer, said post-process simulation modules including a Mend Line Prediction Module.

2. A method, comprising:
   performing a simulation of a thermal fluid flow in a die for a casting or molding process with a computer, the simulation including a model of at least one of: a shot sleeve and ram for the die as a function of ram position, shrinkage of a casting as a function of porosity, a heat transfer line embedded in the die, die lubricant cooling, and mend line formation; which includes:
   establishing a finite element mesh for a domain of the thermal fluid flow;
   determining mass flux relative to the finite element mesh;
   updating a velocity field, a pressure field, and a temperature field relative to the finite element mesh, said updating including calculating the velocity field as a function of the pressure field; and
   repeating said updating until a convergence test is satisfied.

3. The method of claim 2, which includes incrementing a simulation time interval and repeating said determination until a stop simulation criterion is met.

4. The method of claim 2, wherein said updating the pressure field and velocity field is based on conserving momentum and mass according to a control-volume based finite element formulation.

5. The method of claim 2, wherein the simulation includes the model of the shot sleeve and ram for the die, and the model is further provided as a function of one or more dwell parameters.

6. The method of claim 2, wherein the simulation includes the model of the shrinking of the casting as a function of porosity and further comprising:
   defining an expression for the porosity as a function of density;
   identifying nodes with negative pressure;
   creating a reduced pressure gradient field; and
   determining incremental porosity from the reduced pressure gradient field.

7. The method claim 2, wherein the simulation includes the model of the heat transfer line embedded in the die, and further comprising:
   representing the heat transfer line with a number of segments each bounded by a corresponding pair of a number of nodes;
   determining temperature at each of the nodes;
   determining heat transfer between the die and a fluid in the heat transfer line based on the temperature of each of the nodes; and
   determining the temperature field as a function of the heat transfer.

8. The method of claim 2, wherein the simulation includes the model of the die lubricant cooling, and further comprising:
   providing one or more thermal properties of a spray lubricant applied to the die with a nozzle;
   determining a cooling coefficient for the spray lubricant; and
   computing heat loss from one or more elements of the die by application of the lubricant.

9. A method, comprising:
   providing a model of a heat transfer line in a die for casting or molding, the model including a number of segments each associated with one or more element surfaces of the die and a corresponding number of nodes, the model being provided in a one-dimensional form;
   determining heat transfer between the die and fluid in the heat transfer line with the model as a function of temperature at each of the nodes and Reynolds, Prandtl, and Nusselt numbers; and
   with a computer, performing a simulation of a thermal fluid flow in the die based on the heat transfer.

10. The method of claim 9, which includes linearly interpolating temperature between pairs of the nodes.

11. The method of claim 9, wherein the model is defined with a one-dimensional energy equation.

12. The method of claim 11, wherein a heat transfer coefficient is determined as a function of the Nusselt, Pandtl and Reynolds numbers.

13. The method of claim 9, wherein said performing includes updating a temperature field of a finite element mesh representative of a flow domain for the fluid flow.

14. A method, comprising:

performing a simulation of a thermal fluid flow for a casting or molding process with a computer, the process including application of a lubricant spray to a die with a nozzle;

modeling the application of the lubricant spray in the simulation as a function of a number of spray parameters, including the shape of the spray cone, a motion profile of the nozzle, including the path of travel, and a cooling coefficient; and determining heat loss from the die in response to the application of the lubricant spray with the simulation based on said modeling.

15. The method of claim 14, wherein the simulation includes a model of at least one of: a shot sleeve and ram for the die as a function of ram position, shrinkage of a casting as a function of porosity, a heat transfer line embedded in the die, and mend line formation.

* * * * *